United States Patent
Inoue et al.

(10) Patent No.: US 11,728,500 B2
(45) Date of Patent: Aug. 15, 2023

(54) POLYMER ELECTROLYTE MEMBRANE, MEMBRANE ELECTRODE ASSEMBLY, POLYMER ELECTROLYTE FUEL CELL, AND PROCESS FOR PRODUCING POLYMER ELECTROLYTE MEMBRANE

(71) Applicant: ASAHI KASEI KABUSHIKI KAISHA, Tokyo (JP)

(72) Inventors: Yuichi Inoue, Tokyo (JP); Hitoshi Shobukawa, Tokyo (JP); Naoki Sakamoto, Tokyo (JP); Akihiro Kurima, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 38 days.

(21) Appl. No.: 17/613,749

(22) PCT Filed: May 28, 2020

(86) PCT No.: PCT/JP2020/021178
§ 371 (c)(1),
(2) Date: Nov. 23, 2021

(87) PCT Pub. No.: WO2020/241773
PCT Pub. Date: Dec. 3, 2020

(65) Prior Publication Data
US 2022/0238902 A1 Jul. 28, 2022

(30) Foreign Application Priority Data
May 31, 2019 (JP) .................. 2019-102607

(51) Int. Cl.
*H01M 8/1067* (2016.01)
*H01M 8/1004* (2016.01)
*H01M 8/1039* (2016.01)
*H01M 8/1048* (2016.01)
*H01M 8/1046* (2016.01)
*H01M 8/1081* (2016.01)
*H01M 8/10* (2016.01)

(52) U.S. Cl.
CPC ....... *H01M 8/1067* (2013.01); *H01M 8/1004* (2013.01); *H01M 8/1039* (2013.01); *H01M 8/1046* (2013.01); *H01M 8/1048* (2013.01); *H01M 8/1081* (2013.01); *H01M 2008/1095* (2013.01); *H01M 2300/0082* (2013.01)

(58) Field of Classification Search
None
See application file for complete search history.

(56) References Cited

U.S. PATENT DOCUMENTS

| 2007/0104994 | A1 | 5/2007 | Endoh et al. |
| 2008/0280179 | A1 | 11/2008 | Sugiyama et al. |
| 2009/0023028 | A1 | 1/2009 | Sekine |
| 2018/0331369 | A1 | 11/2018 | Kumta et al. |
| 2019/0044170 | A1* | 2/2019 | Hübner ............... C08J 5/2281 |
| 2019/0367676 | A1* | 12/2019 | Kanada ............... H01M 8/1039 |

FOREIGN PATENT DOCUMENTS

| CN | 108408757 | 8/2018 |
| JP | 2001-118591 | 4/2001 |
| JP | 2005-079059 | 3/2005 |
| JP | 2006-294293 | 10/2006 |
| JP | 2007-073352 | 3/2007 |
| JP | 2007-294401 | 11/2007 |
| JP | 2010-257990 | 11/2010 |
| JP | 5044909 B2 | 10/2012 |
| JP | 2013-095757 | 5/2013 |
| JP | 2014-234445 | 12/2014 |
| JP | 2019-102330 | 6/2019 |
| WO | 2005/124911 | 12/2005 |
| WO | 2018/155598 A1 | 8/2018 |

OTHER PUBLICATIONS

ISR issued in International Patent Application No. PCT/JP2020/021178, Aug. 4, 2020, English translation.
IPRP issued in International Patent Application No. PCT/JP2020/021178, Nov. 30, 2021, English translation.
Supplementary Search Report issued in EP Patent Application No. 20813150.8, dated Jul. 6, 2022.

* cited by examiner

*Primary Examiner* — Jonathan Crepeau
(74) *Attorney, Agent, or Firm* — Greenblum & Bernstein P.L.C.

(57) ABSTRACT

Provided is a polymer electrolyte membrane comprising: (a) a polyelectrolyte having an ion exchange capacity of from 0.5 to 3.0 meq/g; and (b) at least one scandium compound selected from the group consisting of scandium oxide, scandium acetate, scandium sulfate, scandium nitrate, and scandium carbonate, wherein a polyethylene glycol (PEG)-derived compound in the polymer electrolyte membrane has a total content of 10 ppm or less.

12 Claims, No Drawings

POLYMER ELECTROLYTE MEMBRANE, MEMBRANE ELECTRODE ASSEMBLY, POLYMER ELECTROLYTE FUEL CELL, AND PROCESS FOR PRODUCING POLYMER ELECTROLYTE MEMBRANE

TECHNICAL FIELD

The present invention relates to a polymer electrolyte membrane, a membrane electrode assembly, a polymer electrolyte fuel cell, and a process for producing a polymer electrolyte membrane.

BACKGROUND ART

Fuel cells have attracted attention as a clean electrical energy source since hydrogen or methanol, for instance, is electrochemically oxidized in each cell to directly convert and extract chemical energy of fuel into electrical energy. Polymer electrolyte fuel cells, in particular, operate at a lower temperature than other fuel cells, and should be used as alternative power sources of automobiles, home co-generation systems, portable power generators, and so on.

Such a polymer electrolyte fuel cell is provided with at least a membrane electrode assembly in which an electrode catalyst layer is attached to each of two faces of a proton exchange membrane mainly including a polymer electrolyte membrane.

Note that the membrane electrode assembly may also be called a structure in which a gas diffusion electrode, which is structured by layering an electrode catalyst layer and a gas diffusion layer, is attached to each of two faces of a proton exchange membrane mainly including a polymer electrolyte membrane.

The proton exchange membrane is a membrane composed of a composition having, in the polymer chain, a strongly acidic group such as a sulfonic acid group and/or a carboxylic acid group and having selective proton permeability. Examples of such a composition used for the proton exchange membrane include a perfluoro-based proton composition represented by chemically stable Nafion (registered trademark; manufactured by DuPont).

During fuel cell operation, a fuel (e.g., hydrogen) is supplied to a gas diffusion electrode on the anode side and an oxidant (e.g., oxygen or the air) is supplied to a gas diffusion electrode on the cathode side. Then, an external circuit is used to connect the two electrodes. In this way, the fuel cell is operated in practice.

Specifically, in the case of using hydrogen as a fuel, hydrogen is oxidized on an electrode catalyst on the anode side to generate a proton. This proton passes through a proton conductive polymer in an electrode catalyst layer on the anode side, travels in a proton exchange membrane, passes through a proton conductive polymer in an electrode catalyst layer on the cathode side, and then reaches an electrode catalyst on the cathode side.

Meanwhile, an electron, which occurs at the same time of proton generation by hydrogen oxidation, goes through an external circuit to reach a gas diffusion electrode on the cathode side. Then, the above proton and oxygen in the oxidant react on the electrode catalyst on the cathode side to produce water. At this time, electrical energy is extracted.

Here, the proton exchange membrane should play a role as a gas barrier partition. Increased gas permeability of the proton exchange membrane may cause a cross leak, that is, a leak of hydrogen, which is supplied from the anode side, toward the cathode side and a leak of oxygen, which is supplied from the cathode side, toward the anode side.

The cross-leak causes what is called a chemical short state, and as a result of which desired electrical energy cannot be extracted. In addition, hydrogen supplied from the anode side and oxygen supplied from the cathode side react to generate hydrogen peroxide. This hydrogen peroxide is decomposed by a trace amount of metal (an Fe, Cr, Ni, or other metal ion) contained in, for instance, supply piping for humid gas fed to a cell. As a result, a hydroxyl radical or a peroxide radical is generated. These radicals cause a problem of promoting deterioration of the proton exchange membrane.

In particular, a fuel cell may be carried in a vehicle. In this case, the fuel cell may be operated under high-temperature conditions at higher than 80° C. or may be operated under low-humidity conditions at a humidity of 30% RH or lower due to a decrease in humidifier use.

Meanwhile, metal-made bipolar plates may be used as bipolar plates between which a membrane electrode assembly is sandwiched in a fuel cell.

In the case of operation under the high-temperature conditions and/or under the low-humidity conditions as described above, even use of a proton exchange membrane that is composed of a perfluoro-based proton composition and is said to have superior durability as a partition membrane for a fuel cell causes a problem of accelerating deterioration of this proton exchange membrane.

In the case of using a metal-made bipolar plate, a metal (e.g., Fe, Cr, Ni) may be eluted gradually during operation. The eluted metal ions cause hydrogen peroxide to be decomposed as described above. As a result, radical species are generated. This may promote deterioration of the proton exchange membrane.

As a method of suppressing radical species-mediated deterioration of a proton exchange membrane as described above, a technology has been disclosed in which a metal oxide (e.g., manganese oxide, cobalt oxide) is dispersed and blended in a polymer electrolyte membrane included in a proton exchange membrane (see, for example, Patent Literature 1).

Another technology has been disclosed in which part of a sulfonic acid group of a polymer electrolyte membrane included in a proton exchange membrane, namely some protons in a plurality of sulfonic acid groups are replaced, using cerium sulfate, by cerium ions; the cerium ions are used to capture radical species; and deterioration of the polymer electrolyte membrane is suppressed (see, for example, Patent Literature 2).

Meanwhile, a technology has been disclosed in which radical species generated in an electrode catalyst layer are decomposed before the radical species enter a polymer electrolyte membrane included in the proton exchange membrane; for this purpose, scandium oxide is added to and dispersed in an electrode catalyst layer to improve chemical durability (see, for example, Patent Literature 3).

CITATION LIST

Patent Literature

Patent Literature 1: Japanese Patent Laid-Open No. 2001-118591
Patent Literature 2: WO 2005/124911
Patent Literature 3: Japanese Patent No. 5044909

SUMMARY OF INVENTION

Technical Problem

Unfortunately, in the technology disclosed in Patent Literature 1, the proton exchange membrane has insufficient heat resistance or resistance to radical species generated by decomposition of hydrogen peroxide. In view of this, there is still room for improvement from the viewpoint of persistence against deterioration of the proton exchange membrane. This is a problem. In addition, no effects are exerted on radicals generated from hydrogen peroxide, as a starting point, that has not been completely decomposed using metal ions. This is another problem.

Also, in the technology disclosed in Patent Literature 2, adopted is a method for immersing, in a cerium sulfate solution, a polymer electrolyte membrane that has been produced as a film by casting and is included in a proton exchange membrane. However, it is difficult to microdisperse cerium in the solution. This is likely to cause aggregation of cerium particles. Cerium ions are thus ununiformly replaced. This makes it difficult to uniformly capture radical species. This is another problem. Further, cerium caused by the aggregation may be detached from the polymer electrolyte membrane. This induces radical species-mediated deterioration of the polymer electrolyte membrane, leading to the risk of causing a decrease in durability. This is another problem.

Furthermore, in the technology disclosed in Patent Literature 3, a method is used in which scandium oxide is mixed by adding and dispersing it in an electrode catalyst layer. However, use of this technology makes it difficult to sufficiently capture, using scandium oxide in the electrode catalyst layer, radical species caused by cross-over on a polymer electrolyte membrane included in a proton exchange membrane. In the technology disclosed in Patent Literature 3, it is thus difficult to sufficiently suppress deterioration of the polymer electrolyte membrane. This is another problem.

Also, in the technology disclosed in Patent Literature 3, scandium oxide may be added to the electrode catalyst layer. In this case, catalyst particles and carbon particles coexist in the electrode catalyst layer. Consequently, scandium oxide is likely to detach. Accordingly, a radical species-capturing reaction proceeds insufficiently. Thus, the effect of improving durability of the polymer electrolyte membrane is unlikely to be achieved. This is another problem.

In addition to this, in the technology disclosed in Patent Literature 3, it is necessary during the process for producing the electrode catalyst layer to prepare and disperse an electrode ink. However, the electrode ink component particles may aggregate due to poor dispersion. In this case, the electrode ink is made ununiform on the surface of the electrode catalyst layer. This may cause poor bonding with the polymer electrolyte membrane included in the proton exchange membrane. Moreover, the aggregates of the electrode ink component particles may be detached from the electrode catalyst layer, causing a decrease in durability. This is another problem.

Here, in light of the above-described problems of the conventional technologies, the purpose of the present invention is to provide a highly durable polymer electrolyte membrane that has excellent characteristics under high-temperature low-humidity conditions and is included in a proton exchange membrane, a membrane electrode assembly including the polymer electrolyte membrane and electrode catalyst layers, and a polymer electrolyte fuel cell.

Solution to Problem

The present inventors have conducted intensive research to solve the above-mentioned problems and, as a result, have found that the above problems of the conventional technologies have been successfully solved by a polymer electrolyte membrane comprising (a) a polyelectrolyte with a prescribed ion exchange capacity and (b) a given scandium compound, wherein a polyethylene glycol (PEG)-derived compound in the polymer electrolyte membrane is specified to have a total content of 10 ppm or less. Then, the invention has been completed.

Specifically, the present invention is as follows.

[1]

A polymer electrolyte membrane comprising: (a) a polyelectrolyte having an ion exchange capacity of from 0.5 to 3.0 meq/g; and (b) at least one scandium compound selected from the group consisting of scandium oxide, scandium acetate, scandium sulfate, scandium nitrate, and scandium carbonate, wherein a polyethylene glycol (PEG)-derived compound in the polymer electrolyte membrane has a total content of 10 ppm or less.

[2]

The polymer electrolyte membrane according to [1], wherein the (b) scandium compound in the polymer electrolyte membrane has a content of 0.0001 mass % or more and 3 mass % or less.

[3]

The polymer electrolyte membrane according to [1] or [2], wherein the (b) scandium compound is dispersed in the (a) polyelectrolyte.

[4]

The polymer electrolyte membrane according to any one of [1] to [3], wherein the (b) scandium compound has a median diameter of 0.0001 μm or more and 12.0 μm or less.

[5]

The polymer electrolyte membrane according to any one of [1] to [4], wherein a polyethylene glycol (PEG)-derived compound in the (b) scandium compound has a total content of 100 ppm or less.

[6]

The polymer electrolyte membrane according to any one of [1] to [5], wherein the (a) polyelectrolyte is a fluorinated polymer electrolyte.

[7]

The polymer electrolyte membrane according to any one of [1] to [6], wherein the (a) polyelectrolyte is a fluorinated polymer electrolyte represented by the following general formula (1):

$$-[CF_2CX^1X^2]_a-[CF_2-CF(-O-(CF_2-CF(CF_2X^3))_b-O_c-(CFR^1)_d-(CFR^2)_e-(CF_2)_f-X^4)]_g- \quad (1)$$

wherein $X^1$, $X^2$, and $X^3$ are, each independently, a halogen element or a perfluoroalkyl group having 1 to 3 carbon atoms; a and g satisfy $0 \leq a < 1$, $0 < g \leq 1$, and $a+g=1$, b is an integer of 0 to 8, c is 0 or 1, d and e are, each independently, an integer of 0 to 6, f is an integer of 0 to 10, provided that d+e+f is not equal to 0; $R^1$ and $R^2$ are, each independently, a halogen element or a perfluoroalkyl group or fluorochloroalkyl group having 1 to 10 carbon atoms; and $X^4$ is COOZ, $SO_3Z$, $PO_3Z_2$, or $PO_3HZ$, wherein Z is a hydrogen atom, an alkali metal atom, an alkali earth metal atom, or an amine such as $NH_4$, $NH_3R^3$, $NH_2R^3R^4$, $NHR^3R^4R^5$, or $NR^3R^4R^5R^6$ where $R^3$, $R^4$, $R^5$ and $R^6$ are each an alkyl group or an arene group.

[8]

The polymer electrolyte membrane according to any one of [1] to [7], further comprising (c) a radical scavenger.

[9]

A membrane electrode assembly comprising:
the polymer electrolyte membrane according to any one of [1] to [8]; and
an electrode catalyst layer placed on the polymer electrolyte membrane.

[10]

The membrane electrode assembly according to [9], wherein the electrode catalyst layer comprises:
(a) a polyelectrolyte having an ion exchange capacity of from 0.5 to 3.0 meq/g; and
(b) at least one scandium compound selected from the group consisting of scandium oxide, scandium acetate, scandium sulfate, scandium nitrate, and scandium carbonate.

[11]

A polymer electrolyte fuel cell comprising the membrane electrode assembly according to [9] or [10].

[12]

A process for producing a polymer electrolyte membrane, comprising the steps of:
adjusting, to 100 ppm or less, a total content of a polyethylene glycol (PEG)-derived compound in (b) at least one scandium compound selected from the group consisting of scandium oxide, scandium acetate, scandium sulfate, scandium nitrate, and scandium carbonate;
dispersing, in a polyelectrolyte solution, the resulting (b) scandium compound, in which the total content of the polyethylene glycol (PEG)-derived compound has been adjusted to 100 ppm or less, to prepare a mixed liquid; and
using the mixed liquid to produce a membrane.

Advantageous Effects of Invention

The invention makes it possible to provide a highly durable polymer electrolyte membrane having excellent characteristics under high-temperature low-humidity conditions, a membrane electrode assembly, and a polymer electrolyte fuel cell.

DESCRIPTION OF EMBODIMENTS

Hereinafter, an embodiment of putting into practice the invention (hereinafter, referred to as "this embodiment") will be described in detail.

This embodiment below is an example for explaining the invention, and is not intended to limit the invention to the following contents. The invention can be exploited by variously modifying it within the scope of the gist.

[Polymer Electrolyte Membrane]

A polymer electrolyte membrane of this embodiment comprises:
(a) a polyelectrolyte having an ion exchange capacity of from 0.5 to 3.0 meq/g; and
(b) at least one scandium compound selected from the group consisting of scandium oxide, scandium acetate, scandium sulfate, scandium nitrate, and scandium carbonate, wherein
a polyethylene glycol (PEG)-derived compound in the polymer electrolyte membrane has a total content of 10 ppm or less.

The polymer electrolyte membrane of this embodiment is configured as above, and is thus highly durable and can elicit excellent characteristics, as a proton exchange membrane for a fuel cell, under high-temperature low-humidity conditions.

((a) Polyelectrolyte)

A polyelectrolyte in this embodiment (hereinafter, sometimes referred to as component (a)) is a polymer compound having an ion-exchange group having an ion exchange capacity of from 0.5 to 3.0 meq/g.

The ion exchange capacity of the (a) polyelectrolyte may be 3.0 meq/g or less. In this case, swelling of the polymer electrolyte membrane is reduced when the polymer electrolyte membrane is used under high-temperature high-humidity conditions during fuel cell operation. The reduction of swelling can suppress a decrease in the strength of the polymer electrolyte membrane and can prevent the occurrence of a defect such as electrode detachment due to occurrence of wrinkles. Further, a problem of decreasing gas barrier property can be reduced.

On the other hand, the ion exchange capacity of the (a) polyelectrolyte may be 0.5 meq/g or higher. In this case, it is possible to favorably maintain power generation capacity of a fuel cell provided with a polymer electrolyte membrane of this embodiment.

From the above-mentioned viewpoints, the (a) polyelectrolyte has an ion exchange capacity of preferably from 0.65 to 2.0 meq/g and more preferably from 0.8 to 1.5 meq/g.

The ion exchange capacity of the (a) polyelectrolyte may be measured as follows.

First, a polyelectrolyte-made membrane, in which a counter ion of an ion-exchange group is protonated, is soaked in a saturated NaCl aqueous solution at 25° C., and the aqueous solution is stirred for a sufficient period. Next, protons in the saturated NaCl aqueous solution are subjected to neutralization titration with 0.01 N aqueous sodium hydroxide. The polyelectrolyte-made membrane, in which the counter ion of an ion-exchange group is in a state of sodium ion after the neutralization and the following filtration, is rinsed with pure water and is further vacuum-dried and then weighed. The substance quantity of sodium hydroxide used for neutralization is represented in M (mmol). The mass of the polyelectrolyte-made membrane, in which a counter ion of an ion-exchange group is a sodium ion, is represented in W (mg). The equivalent weight EW (g/Eq) is then calculated using the following formula:

$$EW=(W/M)-22.$$

Further, the resulting EW value is inverted and multiplied by 1000. In this way, the ion exchange capacity (meq/g) can be calculated.

Preferable examples of the (a) polyelectrolyte include, but are not limited to, a fluorinated polymer electrolyte; a partially fluorinated hydrocarbon-based polymer compound having an aromatic ring in its molecule; or the hydrocarbon-based polymer compound containing an ion-exchange group. From the viewpoint of chemical stability, a fluorinated polymer electrolyte is preferable. Among them, a perfluorocarbon polymer compound containing an ion-exchange group is preferable.

Examples of the (a) polyelectrolyte that is the partially fluorinated hydrocarbon-based polymer compound having an aromatic ring in its molecule include, but are not limited to, a polymer compound, part of which molecule is fluorinated, such as polyphenylene sulfide, polyphenylene ether, polysulfone, polyethersulfone, polyetherethersulfone, polyetherketone, polyetheretherketone, polythioetherether-sulfone, polythioetherketone, polythioetheretherketone, polybenzimidazole, polybenzoxazole, polyoxadiazole, polybenzoxazinone, polyxylylene, polyphenylene, polythiophene, polypyrrole, polyaniline, polyacene, polycyanogene, polynaphthyridine, polyphenylene sulfide-sulfone, polyphenylene sulfone, polyimide, polyetherimide, polyesterimide, polyamide-imide, polyarylate, aromatic polyamide, polystyrene, polyester, or polycarbonate.

From the viewpoints of heat resistance, oxidation resistance, and hydrolysis resistance, preferable examples of the partially fluorinated hydrocarbon-based polymer compound having an aromatic ring in its molecule include, but are not limited to, a polymer compound, part of which molecule is fluorinated, such as polyphenylene sulfide, polyphenylene ether, polysulfone, polyethersulfone, polyetherethersulfone, polyetherketone, polyetheretherketone, polythioetherether-sulfone, polythioetherketone, polythioetheretherketone, polybenzimidazole, polybenzoxazole, polyoxadiazole, polybenzoxazinone, polyxylylene, polyphenylene, polythiophene, polypyrrole, polyaniline, polyacene, polycyanogene, polynaphthyridine, polyphenylene sulfide-sulfone, polyphenylene sulfone, polyimide, polyetherimide, or polyesterimide.

Note that preferable examples of the ion-exchange group introduced into each polymer compound described above include, but are not limited to, a sulfonic acid group, a sulfonimide group, a sulfonamide group, a carboxylic acid group, or a phosphoric acid group. A sulfonic acid group is preferable.

In addition, examples of the perfluorocarbon polymer compound containing an ion-exchange group include, but are not limited to, a perfluorocarbon sulfonic acid resin, a perfluorocarbon carboxylic acid resin, a perfluorocarbon sulfonimide resin, a perfluorocarbon sulfonamide resin, a perfluorocarbon phosphoric acid resin, and an amine salt or a metal salt of each resin.

Preferable examples of the perfluorocarbon polymer compound that is a fluorinated polymer electrolyte constituting the (a) polyelectrolyte include, but are not limited to, a polymer represented by the following general formula (1):

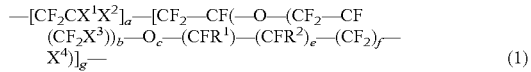
(1)

wherein $X^1$, $X^2$, and $X^3$ are, each independently, a halogen element or a perfluoroalkyl group having 1 to 3 carbon atoms; a and g satisfy $0 \leq a < 1$, $0 < g \leq 1$, and $a+g=1$, b is an integer of 0 to 8, c is 0 or 1, d and e are, each independently, an integer of 0 to 6, f is an integer of 0 to 10, provided that $d+e+f$ is not equal to 0; $R^1$ and $R^2$ are, each independently, a halogen element or a perfluoroalkyl group or fluorochloroalkyl group having 1 to 10 carbon atoms; and $X^4$ is COOZ, $SO_3Z$, $PO_3Z_2$, or $PO_3HZ$, wherein Z is a hydrogen atom, an alkali metal atom, an alkali earth metal atom, or an amine such as $NH_4$, $NH_3R^3$, $NH_2R^3R^4$, $NHR^3R^4R^5$, or $NR^3R^4R^5R^6$ where $R^3$, $R^4$, $R^5$ and $R^6$ are each an alkyl group or an arene group.

Preferable examples of the perfluorocarbon polymer compound that is a fluorinated polymer electrolyte constituting the (a) polyelectrolyte include, in particular, a perfluorocarbon sulfonic acid resin or a metal salt thereof represented by the following general formula (2) or (3):

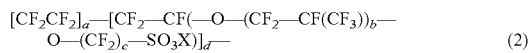
(2)

wherein a and d are $0 \leq a < 1$, $0 \leq d < 1$, and $a+d=1$, b is an integer of 1 to 8, c is an integer of 0 to 10, and X is a hydrogen atom or an alkali metal atom; or

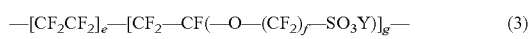
(3)

wherein e and g are $0 \leq e < 1$, $0 \leq g < 1$, and $e+g=1$, f is an integer of 0 to 10, and Y is a hydrogen atom or an alkali metal atom.

The ion-exchange group-containing perfluorocarbon polymer compound that can be used as the (a) polyelectrolyte is not limited to the following. For instance, a precursor polymer represented by general formula (4) below may be subjected to polymerization, alkali hydrolysis, and then acid treatment, etc., to produce the compound.

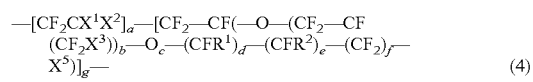
(4)

wherein $X^1$, $X^2$, and $X^3$ are, each independently, a halogen element or a perfluoroalkyl group having 1 to 3 carbon atoms; a and g satisfy $0 \leq a < 1$, $0 < g \leq 1$, and $a+g=1$, b is an integer of 0 to 8, c is 0 or 1, d and e are, each independently, an integer of 0 to 6, f is an integer of 0 to 10, provided that $d+e+f$ is not equal to 0; $R^1$ and $R^2$ are, each independently, a halogen element or a perfluoroalkyl group or fluorochloroalkyl group having 1 to 10 carbon atoms; and $X^5$ is $COOR^7$, $COR^8$, or $SO_2R^8$, where $R^7$ is a hydrocarbon-based alkyl group having 1 to 3 carbon atoms and $R^e$ is a halogen element.

Meanwhile, it is possible to use, as the (a) polyelectrolyte, a polyelectrolyte having the polymer compound disclosed in, for instance, WO 2017/033685.

Specifically, the (a) polyelectrolyte may be produced by polymerizing either a precursor polymer formed using a polymer compound having a ring structure without any ion-exchange group in the polymer main chain and a polymer compound having an ion-exchange group or a precursor polymer formed using a polymer compound having two ion-exchange groups on side chains of a perfluorocarbon polymer compound represented by the above general formula (2) or (3), followed by alkali hydrolysis, acid treatment, and so on.

Each precursor polymer above can be produced by, for example, subjecting a fluorinated olefin compound and a fluorinated vinyl compound to copolymerization although not limited.

Here, examples of the fluorinated olefin compound include, but are not limited to, a compound represented by the following general formula (5):

(5)

wherein Z represents H, Cl, F, a perfluoroalkyl group having 1 to 3 carbon atoms, or a ring-shaped perfluoroalkyl group optionally containing oxygen.

In addition, examples of the fluorinated vinyl compound include, but are not limited to, the following compound such as
$CF_2=CFO(CF_2)_z—SO_2F$,
$CF_2=CFOCF_2CF(CF_3)O(CF_2)_z—SO_2F$,
$CF_2=CF(CF_2)_z—SO_2F$,
$CF_2=CF(OCF_2CF(CF_3))_z—(CF_2)_{z-1}—SO_2F$,
$CF_2=CFO(CF_2)_z—CO_2R$,
$CF_2=CFOCF_2CF(CF_3)O(CF_2)_z—CO_2R$,
$CF_2=CF(CF_2)_z—CO_2R$, or
$CF_2=CF(OCF_2CF(CF_3))_z—(CF_2)_2—CO_2R$
wherein Z represents an integer of 1 to 8 and R represents a hydrocarbon-based alkyl group having 1 to 3 carbon atoms.

Examples of the process for copolymerization of the fluorinated olefin compound and the fluorinated vinyl compound include, but are not limited to, the below-described processes.

(i) Solution Polymerization

Solution polymerization is a process in which a polymerization solvent such as fluorine-containing hydrocarbon is used and while charged and dissolved in this polymerization solvent, a fluorinated vinyl compound and fluorinated olefin gas are reacted for polymerization.

Examples of the fluorine-containing hydrocarbon that can be used as the polymerization solvent include, but are not limited to, a compound group generally called "flon" such as 1,1,1,2,3,4,4,5,5,5-decafluoropentane.

(ii) Bulk Polymerization

Bulk polymerization is a process in which a polymerization solvent such as fluorine-containing hydrocarbon is not used and a fluorinated vinyl compound, as it is, is used as a polymerization solvent, and a fluorinated olefin compound and the fluorinated vinyl compound are then polymerized.

(iii) Emulsifying Polymerization

Emulsifying polymerization is a process in which a surfactant-containing aqueous solution is used as a polymerization solvent and while charged and dissolved in this polymerization solvent, a fluorinated vinyl compound and fluorinated olefin gas are reacted for polymerization.

(iv) Mini-Emulsion Polymerization or Micro-Emulsion Polymerization

Emulsion polymerization is a process in which an aqueous solution containing a surfactant and an auxiliary emulsifier such as alcohol is used, and while charged and emulsified in this aqueous solution, a fluorinated vinyl compound and fluorinated olefin gas are reacted for polymerization.

(v) Suspension Polymerization

Suspension polymerization is a process in which a suspension stabilizer-containing aqueous solution is used, and while charged and suspended in this aqueous solution, a fluorinated vinyl compound and fluorinated olefin gas are reacted for polymerization.

A melt mass-flow rate (hereinafter, abbreviated as "MFR") can be used as an indicator for the degree of polymerization of a precursor polymer used in the (a) polyelectrolyte constituting the polymer electrolyte membrane of this embodiment.

The precursor polymer has an MFR of preferably 0.01 g/10 min or larger, more preferably 0.1 g/10 min or larger, and still more preferably 0.3 g/10 min or larger. The upper limit of the MFR is not restricted and is preferably 100 g/10 min or less and more preferably 10 g/10 min or less.

If the MFR is 0.01 g/10 min or more and 100 g/10 min or less, the molding processability such as formation of the polymer electrolyte membrane in this embodiment tends to be better.

Note that the MFR may be measured based on JIS K-7210 at 270° C. and a load of 2.16 kgf while the orifice inner diameter is set to 2.09 mm.

The precursor polymer as so prepared is subjected to hydrolysis in a basic reaction solution, sufficient washing with, for instance, warm water, and acid treatment. This acid treatment makes the perfluorocarbon sulfonic acid resin precursor protonated to form a $SO_3H$ moiety.

((b) Scandium Compound)

The (b) scandium compound used in a polymer electrolyte membrane of this embodiment is at least one scandium compound selected from the group consisting of scandium oxide, scandium acetate, scandium sulfate, scandium nitrate, and scandium carbonate.

The oxidation number of scandium in the (b) scandium compound is known to be III. The (b) scandium compound exerts an effect of suppressing decomposition of hydrogen peroxide. Accordingly, a decomposition reaction, by which hydroxyl radicals and/or peroxidation radicals are generated from hydrogen peroxide, can be suppressed. This makes the polymer electrolyte membrane of this embodiment excel in durability.

The content of the (b) scandium compound in the polymer electrolyte membrane is preferably from 0.0001 to 3.0000 mass %, more preferably from 0.0003 to 2.5000 mass %, and still more preferably from 0.0005 to 2.0000 mass %. If the content of the (b) scandium compound is from 0.0001 to 3.0000 mass %, decomposition of hydrogen peroxide can be suppressed while the proton conductivity is kept favorable. Thus, a highly durable polymer electrolyte membrane or electrode catalyst layer is likely to be produced.

In the polymer electrolyte membrane of this embodiment, the (b) scandium compound is preferably dispersed in the above-described (a) polyelectrolyte.

As used herein, the dispersion means a state in which a phase containing a metal salt as the (b) scandium compound is dispersed like particles, namely "dispersed like islands", in a polyelectrolyte (component a) phase when observed under a TEM without staining. That is, this means formation of a sea-island structure in which the component (a) constitutes a sea portion and the component (b) constitutes an island portion. The dispersion in such a state represents a state in which a portion mainly containing the metal salt (component (b)) is micro-dispersed uniformly in a portion mainly containing the polyelectrolyte (component (a)). This is preferable from the viewpoint of durability.

The median diameter of the (b) scandium compound is preferably from 0.0001 to 12.0 μm, more preferably from 0.0005 to 5.0 μm, and still more preferably from 0.001 to 1.0 μm.

If the median diameter of the (b) scandium compound is from 0.0001 to 12.0 μm, decomposition of hydrogen peroxide can be suppressed while the proton conductivity is kept favorable. Thus, a highly durable polymer electrolyte membrane or electrode catalyst layer is likely to be produced.

This is because if the median diameter of the (b) scandium compound is from 0.0001 to 12.0 μm, the specific surface area per unit mass can be enlarged. This can reduce the additive amount to a low level. Thus, both favorable proton conductivity and high chemical durability should be able to be established.

Examples of the procedure for adjusting the above "median diameter to 0.0001 to 12.0 μm" in the (b) scandium compound include: but are not limited to, a procedure for using, for instance, a jet mill or a ball mill to impart high impact/shear energy to and pulverize and miniaturize the compound; or a procedure for removing bulk particles by filtering a solution before a polymer electrolyte membrane is formed.

A polyethylene glycol (PEG)-derived compound in the (b) scandium compound used for the polymer electrolyte membrane of this embodiment has a total content of preferably 100 ppm or less. The total content is more preferably more than 0 ppm and 50 ppm or less and still more preferably more than 0 ppm and 10 ppm or less.

The total content of the PEG-derived component in the (b) scandium compound may be 100 ppm or less. In this case, a highly durable polymer electrolyte membrane or electrode catalyst layer is likely to be produced while superior cell characteristics remain the same.

Examples of the procedure for removing a PEG (polyethylene glycol)-derived component contained in the (b) scandium compound include, but are not limited to, a procedure for immersing the (b) scandium compound in distilled water or an acidic solution or the like.

The PEG-derived component in the polymer electrolyte membrane of this embodiment has a total content of 10 ppm or less.

If the total content of the PEG-derived component in the polymer electrolyte membrane of this embodiment is 10 ppm or less, a decrease in cell characteristics due to poisoning of, for instance, an electrode catalyst can be suppressed. Because the (b) scandium compound is included, both high chemical durability and superior cell characteristics should be able to be established.

The total content is more preferably more than 0 ppm and 8 ppm or less and still more preferably more than 0 ppm and 5 ppm or less.

The total content of the PEG-derived component in the polymer electrolyte membrane may be more than 0 ppm and 8 ppm or less. This can suppress a decrease in cell characteristics due to poisoning of, for instance, an electrode catalyst while dispersion of the scandium compound in a coating liquid is kept favorable. Thus, both high chemical durability and superior cell characteristics should be able to be established.

Note that although not limited, the PEG-derived component included in the polymer electrolyte membrane may be determined by, for instance, soaking the polymer electrolyte membrane in distilled water for extraction and measuring the resulting extract by LC/MS (Liquid Chromatography/Mass Spectrometry).

The total content of the PEG-derived component in the polymer electrolyte membrane of this embodiment can be controlled within the above numerical range by adjusting the total content of polyethylene glycol (PEG)-derived compound in the (b) scandium compound to 100 ppm or less and by adjusting the content of the (b) scandium compound in accordance with the procedures described later.

((c) Radical Scavenger)

The polymer electrolyte membrane of this embodiment may further comprise (c) a radical scavenger.

In the polymer electrolyte membrane of this embodiment, as described above, occurrence of radical species can be prevented efficiently, so that high durability can be elicited. In addition, inclusion of the (c) radical scavenger makes it possible to capture radical species by the (c) radical scavenger in case of their occurrence. This is likely to be able to remarkably increase durability of fuel cell even under high-temperature low-humidity conditions, which are required in fuel cell vehicles.

Examples of the (c) radical scavenger include, but are not limited to, a compound with a functional group enabling the mechanism proposed for known antioxidants.

Examples of such a functional group include, but are not limited to, a functional group with a radical chain inhibitor function, a functional group with a radical decomposition function, and a functional group with a chain initiation inhibitor function.

Examples of the functional group with a radical chain inhibitor function include, but are not limited to, a phenolic hydroxyl group, a primary amine, or a secondary amine.

In addition, examples of the functional group with a radical decomposition function include, but are not limited to, for instance, a sulfur- or phosphorus-containing mercapto group, a thioether group, a disulfide group, or a phosphite group.

Further, examples of the functional group with a chain initiation inhibitor function include, but are not limited to, hydrazine or amide ("Antioxidant Handbook" (TAISEI-SHUPPAN CO., LTD., 1978).

Meanwhile, the (c) radical scavenger may be a compound in which an atom is easily withdrawn by a radical. Examples include a compound with a structure having a hydrogen bonded to a tertiary carbon or a carbon-halogen bond.

In addition, the (c) radical scavenger optionally contains a functional group that forms an ion bond with the (a) polyelectrolyte. Examples of the (c) radical scavenger include, but are not limited to, a compound (c-1) having at least one amine of a primary amine or a secondary amine in the same molecule; and/or a compound (c-2) having a tertiary amine in the same molecule and having at least one kind selected from the group consisting of: hydrogen bonded to sulfur, phosphorus, hydrazine, amido, a phenolic hydroxyl group, a primary amine, a secondary amine, or a tertiary amine; and halogen bonded to carbon.

Examples of the functional group of the compound (c-1) and the compound (c-2) that forms an ion bond with the (a) polyelectrolyte include, but are not limited to, a basic functional group in the case where an ion-exchange group in the (a) polyelectrolyte is a sulfonic acid group. Specific examples include a nitrogen-containing functional group such as a primary, secondary, or tertiary amine. Thus, the primary or secondary amine, if any, interacts with the ion-exchange group of the (a) polyelectrolyte. This (corresponding to the compound (c-1)) can function to capture radicals.

By contrast, a tertiary amine moiety may interact with the ion-exchange group of the (a) polyelectrolyte. In this case, it is preferable that the functional group that forms an ion bond with the (a) polyelectrolyte is apart from a moiety having a radical-capturing function and is included in the same molecule. Example of such a functional group include, but are not limited to, a phenolic hydroxyl group or a primary or secondary amine (i.e., this corresponds to the compound (c-2)).

Specific examples of the compound (c-1) and the compound (c-2) as the (c) radical scavenger include the following.

Examples of the compound (c-1) include: but are not limited to, an aromatic compound (e.g., polyaniline), part of which is substituted by the above functional group; or an unsaturated heterocyclic compound (e.g., polybenzimidazole, polybenzoxazole, polybenzothiazole, polybenzoxadiazole, phenylated polyquinoxaline, and phenylated polyquinoline).

Examples of the compound (c-2) include, but are not limited to, a compound having, on a side chain, a heterocycle containing tertiary nitrogen having acid-base bonding to sulfonic acid and having, on the main chain at benzyl position, hydrogen easily withdrawn by a radical. Specific examples include polyvinyl pyridine, polyvinyl carbazole, or polystyrene containing an aromatic ring group having a secondary and tertiary amine introduced.

Note that the compound (c-1) and the compound (c-2) may be, for instance, a copolymer of a unit that interacts with the (a) polyelectrolyte having an ion-exchange group and a unit that functions to capture a radical. The presence of the moiety that interacts with the (a) polyelectrolyte having an ion-exchange group is likely to improve compatibility with the (a) polyelectrolyte. In addition, the presence of the moiety that functions to capture a radical is likely to improve chemical durability.

The content of compound (c-1) and the compound (c-2) in the polymer electrolyte membrane of this embodiment with respect to the polymer electrolyte membrane is preferably from 0.001 to 50.000 mass %, more preferably from 0.005 to 20.000 mass %, still more preferably from 0.010 to 10.000 mass %, still more preferably from 0.100 to 5.000 mass %, and still more preferably from 0.100 to 2.000 mass %.

The total content of compound (c-1) and the compound (c-2) in the polymer electrolyte membrane of this embodiment may be set within the above range (from 0.001 to 50.000 mass %). In this case, a highly durable polymer electrolyte membrane is likely to be produced while favorable proton conductivity is maintained.

((d) Thioether Compound)

The polymer electrolyte membrane of this embodiment optionally comprises (d) a thioether compound in addition to the above described (a) polyelectrolyte, (b) scandium compound, and (c) radical scavenger.

Examples of the (d) thioether compound include, but are not limited to, a compound containing a chemical structure: —(R—S)$_n$— where S is a sulfur atom, R is a hydrocarbon group, and n is an integer of 1 or more. Specific examples include a dialkyl thioether (e.g., dimethylthioether, diethylthioether, dipropylthioether, methylethylthioether, methylbuthylthioether); a cyclicthioether (e.g., tetrahydrothiophene, tetrahydroapyran); or an aromatic thioether (e.g., methylphenylsulfide, ethylphenylsulfide, diphenylsulfide, dibenzylsulfide).

They may be used as a monomer, or may be used as a polymer like, for instance, polyphenylene sulfide (PPS).

From the viewpoint of durability, the (d) thioether compound containing a chemical structure: —(R—S)$_n$— where S is a sulfur atom, R is a hydrocarbon group, and n is an integer of 1 or more is preferably provided as a polymer where n≥10 (e.g., an oligomer, polymer) and more preferably as a polymer where n≥1,000. Still more preferably, the (d) thioether compound is polyphenylene sulfide (PPS).

Hereinafter, the polyphenylene sulfide that can be used as the (d) thioether compound will be described.

The polyphenylene sulfide that can be used as the component (d) is polyphenylene sulfide having a paraphenylenesulfide backbone in an amount of preferably 70 mol % or larger and more preferably 90 mol % or larger.

Examples of a process for producing the above polyphenylene sulfide include: but are not limited to, a process for polymerizing a halogen-substituted aromatic compound (e.g., p-dichlorobenzene) in the presence of sulfur and sodium carbonate; a process for polymerizing a halogen-substituted aromatic compound in a polar solvent in the presence of sodium sulfide or sodium hydrogen sulfide and sodium hydroxide; a process for polymerizing a halogen-substituted aromatic compound in a polar solvent in the presence of hydrogen sulfide and sodium hydroxide or sodium aminoalkanoate; or a process for subjecting p-chlorothiophenol to self-condensation. Specifically, it is particularly preferable to use a process for making a reaction of sodium sulfide with p-dichlorobenzene in an amide-based solvent such as N-methylpyrrolidone or dimethylacetamide or a sulfone-based solvent such as sulfolane.

Meanwhile, the content of —SX group (where S is a sulfur atom and X is an alkali metal or a hydrogen atom) of the component (d) polyphenylene sulfide based on the total amount of the (a) polyelectrolyte and the (d) polyphenylene sulfide is usually 10 µmol/g or more and 10,000 µmol/g or less, preferably 15 µmol/g or more and 10,000 µmol/g or less, and more preferably 20 µmol/g or more and 10,000 µmol/g or less.

If the concentration of —SX group is within the above range, the number of reaction active points tends to increase. The polyphenylene sulfide, the concentration of —SX group satisfies the above range, may be used to make it more miscible with the (a) polyelectrolyte in this embodiment, thereby increasing dispersibility. This can provide higher durability under high-temperature low-humidity conditions.

In addition, it is possible to preferably use the (d) thioether compound having an acidic functional group introduced at its end. Preferable examples of the introduced acidic functional group include, but are not limited to, a sulfonic acid group, a phosphoric acid group, a carboxylic acid group, a maleic acid group, a maleic anhydride group, a fumaric acid group, an itaconic acid group, an acrylic acid group, or a methacrylic acid group. Among them, a sulfonic acid group is preferable.

Note that the procedure for introducing an acidic functional group into the (d) thioether compound is not particularly limited. A common procedure may be used and put into practice.

For instance, a sulfonic acid group may be introduced using a sulfonating agent (e.g., sulfuric anhydride, fuming sulfuric acid) under known conditions. Such an introduction procedure is not limited to the following, and may be carried out under conditions described in, for example, K. Hu, T. Xu, W. Yang, Y. Fu, Journal of Applied Polymer Science, Vol. 91; or E. Montoneri, Journal of Polymer Science: Part A: Polymer Chemistry, Vol. 27, 3043-3051 (1989).

In addition, it is possible to preferably use the (d) thioether compound in which an introduced acidic functional group is replaced by a metal salt or an amine salt. Preferable examples of the metal salt include, but are not limited to, an alkali metal salt (e.g., a sodium salt, a potassium salt) or an alkali earth metal salt (e.g., a calcium salt).

Further, when the polymer electrolyte membrane of this embodiment is produced, the (d) thioether compound may be used as powder. In this case, the (d) thioether compound in a water-dispersed state has a median diameter of preferably from 0.01 to 2.0 µm, more preferably from 0.01 to 1.0 µm, still more preferably from 0.01 to 0.5 µm, and still more preferably from 0.01 to 0.1 µm. If the median diameter is within the above range, the dispersibility in the (a) polyelectrolyte is higher and the effects on, for instance, the durability and long service life are likely to be better. Note that the median diameter of the (d) thioether compound may be determined by observation with, for instance, a particle size distribution analyzer or a scanning electron microscope (SEM) although the observation is not limited thereto.

Examples of a procedure for micro-dispersing the (d) thioether compound in the (a) polyelectrolyte include: but are not limited to, a procedure for pulverizing and micro-dispersing the (d) thioether compound by applying high-shear force during melt-kneading with, for instance, the (a) polyelectrolyte; or a procedure in which the (a) polyelectrolyte and the (d) thioether compound are used to prepare a mixed liquid, the mixed liquid is then filtered to remove bulk particles of the (d) thioether compound, and the resulting filtrate is used.

The (d) thioether compound may be dispersed in the (a) polyelectrolyte by melt-kneading. At that time, polyphenylene sulfide, which is suitable as the component (d), may be used. In this case, the melt viscosity of the polyphenylene sulfide (the value obtained by using a flow tester held for 6 min at 300° C. and at a load of 196 N and with an L/D (L: the orifice length; D: the orifice inner diameter) of 10/1) is preferably from 1 to 10,000 poise and more preferably from 100 to 10,000 poise from the viewpoint of molding processability.

The mass ratio (a/d) between the (a) polyelectrolyte and the (d) thioether compound in the polymer electrolyte membrane of this embodiment is preferably (a/d)=60/40 to 99.99/0.01, more preferably (a/d)=70/30 to 99.95/0.05, still more preferably (a/d)=80/20 to 99.9/0.1, and still more preferably (a/d)=90/10 to 99.5/0.5.

If the mass ratio of the (a) polyelectrolyte is 60 or higher, favorable ion conductivity can be realized. Thus, superior cell characteristics are likely to be achieved. On the other hand, if the mass ratio of the (d) thioether compound is 40 or lower, durability during cell operation under high-temperature low-humidity conditions is likely to be improved.

Meanwhile, the (d) thioether compound may be blended with the above-mentioned (c) radical scavenger. This is likely to make the polymer electrolyte membrane of this embodiment markedly highly durable under high-temperature low-humidity conditions.

The mass ratio (c/d) between the (c) radical scavenger and the (d) thioether compound is preferably (c/d)=1/99 to 99/1, more preferably (c/d)=5/95 to 95/5, still more preferably (c/d)=10/90 to 90/10, and still more preferably (c/d)=20/80 to 80/20.

If the mass ratio (c/d) is within the above range, the chemical stability and the durability (dispersibility) are likely to be more balanced.

Further, the total mass of the (c) radical scavenger and the (d) thioether compound based on the content of the polymer electrolyte membrane is preferably from 0.01 to 50 mass %, more preferably from 0.05 to 45 mass %, still more preferably from 0.1 to 40 mass %, still more preferably from 0.2 to 35 mass %, and still more preferably from 0.3 to 30 mass %. If the total content of the components (c) and (d) is within the above range, the ion conductivity and the durability (dispersibility) are likely to be more balanced.

Meanwhile, the polymer electrolyte membrane of this embodiment may be produced using a polyelectrolyte solution (hereinafter, sometimes also referred to as a polyelectrolyte composition) comprising the given components: the (a) polyelectrolyte and the (b) scandium compound as described above, as essential components. Such a polyelectrolyte composition can be processed into a form of polymer electrolyte membrane or the below-described electrode catalyst layer. In addition, the polyelectrolyte composition may be used in other forms such as a polyelectrolyte-containing binder.

(Polyelectrolyte Solution)

The polymer electrolyte membrane of this embodiment may be formed using a polyelectrolyte composition comprising, as essential components, the (a) polyelectrolyte and the (b) scandium compound.

Each component of the polyelectrolyte composition may be dissolved or dispersed at the same time or separately in a given solvent and then mixed to prepare a polyelectrolyte solution upon use.

The polyelectrolyte solution may be used as it is or may undergo a step(s) such as filtration or enrichment, and may then be mixed alone or with another electrolyte solution to be used as a material such as a polymer electrolyte membrane or an electrode-use binder.

A process for producing the polyelectrolyte solution will be described.

The polyelectrolyte solution production process is not limited to the following, and comprises, for instance, first immersing and then hydrolyzing a molded product including a polyelectrolyte precursor in a basic reaction liquid. This hydrolysis treatment converts the polyelectrolyte precursor into the (a) polyelectrolyte. Next, the hydrolyzed molded product is sufficiently washed with, for instance, warm water and then subjected to acid treatment.

Preferable examples of the acid used for the acid treatment include, but are not particularly limited to, a mineral acid (e.g., hydrochloric acid, sulfuric acid, nitric acid) or an organic acid (e.g., oxalic acid, acetic acid, formic acid, trifluoroacetic acid). This acid treatment makes the polyelectrolyte precursor protonated to give a $SO_3H$ moiety. The molded product as so treated with acid (the molded product containing a protonated product of the (a) polyelectrolyte) is dissolved and/or suspended in a solvent into which the (a) polyelectrolyte can be dissolved and/or suspended (a solvent well miscible with a resin).

Examples of such a solvent include, but are not limited to, a protonic organic solvent (e.g., water, ethanol, methanol, n-propanol, isopropyl alcohol, butanol, glycerin); or an aprotonic solvent (e.g., N,N-dimethylformamide, N,N-dimethylacetamide, N-methylpyrrolidone). One kind among them may be used singly, or two or more kinds may be used in combination. If one kind of solvent is used, in particular, water is preferably used singly. In addition, if two or more kinds are used in combination, a mixed solvent of water and a protonic organic solvent is preferable.

The dissolution and/or suspension procedure is not limited to the following. For instance, it is preferable to dissolve and/or disperse the molded product as it is in each solvent described above. It is preferable to dissolve and/or disperse the molded product at a temperature ranging from 0 to 250° C. under atmospheric pressure or under hermetically sealed and pressurized conditions in, for instance, an autoclave. Particularly, a protonic organic solvent may be used as the solvent. In this case, the mixed ratio between water and the protonic organic solvent may be selected, if appropriate, depending on the dissolution procedure, the solubilization conditions, the kind of the (a) polyelectrolyte, the total solid content, the dissolution temperature, the stirring rate, and so on. The mass ratio of the protonic organic solvent with respect to water is preferably the protonic organic solvent per water of from 0.1 to 10 and more preferably the protonic organic solvent per water of from 0.1 to 5.

Note that examples of the liquid for dissolving/suspending the (a) polyelectrolyte include: but are not particularly limited to, an emulsion (in an emulsion state in which liquid particles are dispersed in a liquid as colloidal particles or more bulky particles); a suspension (in a state in which solid particles are dispersed in a liquid as colloidal particles or particles that can be observed under a microscope); a colloidal liquid (in a state in which giant molecules are dispersed); or a micelle liquid (a lyophilic colloid dispersion in which many small molecules are associated using intermolecular force). One kind or two or more kinds thereof may be included.

As described above, the polyelectrolyte solution may be used for production of the polymer electrolyte membrane of this embodiment and comprises the (b) scandium compound.

The (b) scandium compound may be included in the polyelectrolyte solution, for example, after the step of adding the (b) scandium compound to a solution of the (a) polyelectrolyte.

In addition, the polyelectrolyte solution may further comprise a solvent depending on the molding process and/or usage. Examples of such a solvent include, but are not particularly limited to, at least one kind selected from water, an organic solvent, a liquid resin monomer, or a liquid resin oligomer.

Examples of the organic solvent include: but are not limited to, an alcohol (e.g., methanol, ethanol, 2-propanol, butanol, octanol); an ester (e.g., ethyl acetate, butyl acetate, ethyl lactate, propylene glycol monomethyl ether acetate, propylene glycol monoethyl ether acetate, γ-butyrolactone); an ether (e.g., diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, diethylene glycol monoethyl ether); a ketone (e.g., acetone, methyl ethyl ketone, methyl isobutyl ketone, acetyl acetone, cyclohexanone); an aromatic hydrocarbon (e.g., benzene, toluene, xylene, ethylbenzene); or an amide (e.g., dimethylformamide, N,N-dimethylacetamide, N-methylpyrrolidone). One kind of the organic solvent may be used singly, or two or more kinds thereof may be used in combination.

Further, the polyelectrolyte solution may be concentrated and/or filtered depending on the molding process and/or usage.

Examples of the concentration procedure include, but are not limited to, a procedure for heating and evaporating a solvent or a procedure for concentration under reduced pressure.

The polyelectrolyte solution may be used as a coating solution. In this case, the solid content in the polyelectrolyte solution is preferably from 0.5 to 50 mass %. If the solid content is 0.5 mass % or higher, an increase in the viscosity is suppressed. Thus, the handling is likely to be excellent. In addition, if the solid content is 50 mass % or lower, the productivity is likely to increase.

Representative examples of the filtration procedure include, but are not limited to, a procedure for pressurized filtration using a filter.

It is preferable to use, as the filter, a filter material in which the 90%-collection particle size is 10 to 100 times the average particle size of the particles. Examples of this filter material include a paper-made one or a metal-made one. If the filter material is paper, in particular, the 90%-collection particle size is preferably 10 to 50 times the average particle size of the particles. In the case of using a metal-made filter, the 90%-collection particle size is preferably 50 to 100 times the average particle size of the particles. The 90%-collection particle size may be 10 or more times the average particle size. This can prevent the pressure required for feeding a liquid from becoming too high. Also, this is likely to be able to prevent clogging of the filter in a short period. On the other hand, the 90%-collection particle size may be 100 or less times the average particle size. This is likely to be able to well-remove particle aggregates and/or an undissolved resin that may cause a film foreign substance.

(Membrane Thickness of Polymer Electrolyte Membrane)

The polymer electrolyte membrane of this embodiment contains a polyelectrolyte composition comprising, as essential components, the (a) polyelectrolyte and the (b) scandium compound as described above.

The membrane thickness of the polymer electrolyte membrane of this embodiment is preferably 1 μm or more and 500 μm or less, more preferably 2 μm or more and 100 μm or less, and still more preferably 5 μm or more and 50 μm or less. The membrane thickness may be 1 μm or more. This not only makes it possible to mitigate a disadvantage such as a direct reaction of hydrogen with oxygen, but also tends to cause less occurrence of, for instance, damage to the polymer electrolyte membrane at the handling during manufacture of a fuel cell and/or even when a pressure difference/distortion, for instance, occurs during fuel cell operation.

On the other hand, the membrane thickness may be 500 μm or less. This can increase ion permeability and is likely to improve performance as a solid polymer electrolyte membrane.

[Process for Producing Polymer Electrolyte Membrane]

A process for producing a polymer electrolyte membrane will be described.

The polymer electrolyte membrane production process is not particularly limited. The above-described polyelectrolyte solution may be used to produce the membrane by casting or mold the membrane after a step(s) such as melt-extrusion and stretching.

In the case of molding by melt-extrusion, it is preferable from the viewpoint of moldability that a mixture of the polyelectrolyte precursor, the (b) scandium compound, and optionally the (c) radical scavenger and the (d) thioether compound are subjected to melt-kneading and then extrusion molding to form a membrane, and the membrane is then immersed and hydrolyzed in a basic reaction solution. This hydrolysis treatment converts the polyelectrolyte precursor into the (a) polyelectrolyte.

Further, after the hydrolysis treatment in the basic reaction solution as described above, the membrane is subjected to sufficient washing with, for instance, warm water and then acid treatment.

Preferable examples of the acid used for the acid treatment include, but are not limited to, a mineral acid (e.g., hydrochloric acid, sulfuric acid, nitric acid) or an organic acid (e.g., oxalic acid, acetic acid, formic acid, trifluoroacetic acid). This acid treatment makes the polyelectrolyte precursor protonated to give a $SO_3H$ moiety.

In addition, the polymer electrolyte membrane of this embodiment may be reinforced, for instance, with: a porous body made of, for instance, polytetrafluoroethylene (PTFE), a tetrafluoroethylene-hexafluoropropylene copolymer (FEP), a tetrafluoroethylene-perfluoro(alkoxy vinyl ether) copolymer (PFA), polyethylene or polypropylene, a porous sheet made of, for instance, fiber, woven fabric, or nonwoven fabric; or an inorganic whisker made of, for instance, silica or alumina, an organic filler made of, for instance, polytetrafluoroethylene (PTFE), polyethylene, or polypropylene.

The polymer electrolyte membrane of this embodiment may be further cross-linked using a cross-linker and/or, for instance, UV light, electron beam, or radiation.

The polymer electrolyte membrane of this embodiment is preferably heated after the molding. The heat treatment can promote crystallization of the polyelectrolyte, thereby stabilizing the mechanical strength of the polymer electrolyte membrane. In addition, the heat treatment causes firm bonding between the crystal portion of the additives such as the (c) radical scavenger and the (d) thioether compound and the polyelectrolyte portion. As a result, the mechanical strength is likely to be stabilized more.

The heat treatment temperature is preferably 120° C. or higher and 300° C. or lower, more preferably 140° C. or higher and 250° C. or lower, and still more preferably 160° C. or higher and 230° C. or lower. If the heat treatment temperature is 120° C. or higher, the tight attachment between the crystal portion and the polyelectrolyte portion is likely to become higher.

On the other hand, if the heat treatment temperature is 300° C. or lower, the characteristics of the polymer electrolyte membrane tend to improve more.

Depending on the heat treatment temperature, the heat treatment period is preferably 5 min or longer and 3 h or shorter and more preferably 10 min or longer and 2 h or shorter.

Note that in the process for producing a polymer electrolyte membrane according to this embodiment, it is preferable to perform a step of adjusting, in advance, the total content of a polyethylene glycol (PEG)-derived compound in the (b) scandium compound to 100 ppm or less, a step of dispersing, in a polyelectrolyte solution, the resulting scandium compound obtained in the above step, in which the total content of the polyethylene glycol (PEG)-derived compound has been adjusted to 100 ppm or less, to prepare a mixed liquid, and a step of using the mixed liquid to produce a membrane.

Examples of the procedure for removing the PEG (polyethylene glycol)-derived component contained in the (b) scandium compound include, but are not limited to, a procedure for immersing the (b) scandium compound in distilled water or an acidic solution.

[Membrane Electrode Assembly]

A membrane electrode assembly according to this embodiment has the above-described polymer electrolyte membrane and electrode catalyst layers.

Specifically, the membrane electrode assembly of this embodiment includes: the polymer electrolyte membrane of this embodiment and electrode catalyst layers placed on the polymer electrolyte membrane.

The polymer electrolyte membrane of this embodiment may be used as a component member of a membrane electrode assembly and a polymer electrolyte fuel cell.

A unit in which two different electrode catalyst layers, which are anode and cathode ones, are each attached to one of both faces of the polymer electrolyte membrane is called a membrane electrode assembly (hereinafter, sometimes abbreviated as "MEA"). Here, a unit in which a pair of gas diffusion layers is attached further outside and faces each electrode catalyst layer may also called MEA.

A known electrode catalyst layer used for MEA is applicable to each electrode catalyst layer included in the membrane electrode assembly of this embodiment.

The electrode catalyst layer is preferably structured by including the above-described polyelectrolyte composition. Specifically, the electrode catalyst layer in the membrane electrode assembly of this embodiment preferably comprises: (a) a polyelectrolyte having an ion exchange capacity of from 0.5 to 3.0 meq/g; and (b) at least one scandium compound selected from the group consisting of scandium oxide, scandium acetate, scandium sulfate, scandium nitrate, and scandium carbonate. In this case, the electrode catalyst layer may comprise the polyelectrolyte composition and may optionally comprise catalyst metal microparticles and a conducting agent having the microparticles supported. A water repellent may be further included if necessary. The catalyst metal used in the electrode catalyst layer is not particularly limited as far as the metal can promote a hydrogen oxidation reaction and an oxygen reduction reaction. Examples include, but are not limited to, platinum, gold, silver, palladium, iridium, rhodium, ruthenium, iron, cobalt, nickel, chromium, tungsten, manganese, vanadium, or an alloy thereof. Among them, platinum is primarily and preferably used.

A method for manufacturing a membrane electrode assembly (MEA) of this embodiment is not particularly limited. For instance, the following method is implemented.

First, a binder ion-exchange resin for an electrode catalyst layer is dissolved in a mixed solution of alcohol and water. Carbon having a catalyst metal platinum supported is dispersed in the mixed solution to prepare a paste. A certain amount of this paste is coated on a PTFE sheet and then dried. Next, the above-described polymer electrolyte membrane may be sandwiched between the above PTFE sheets while facing the coating surface. The resulting material may be transfer-bonded by heat press at 100° C. to 200° C. to manufacture a membrane electrode assembly (MEA).

It is possible to commonly use, as the binder ion-exchange resin for an electrode catalyst layer, those prepared by dissolving an ion-exchange resin into a solvent (e.g., alcohol, water). In the case of manufacturing the membrane electrode assembly of this embodiment, it is possible to use a polyelectrolyte composition comprising the above-mentioned (a) polyelectrolyte and (b) scandium compound that can be used for production of the polymer electrolyte membrane of this embodiment from the viewpoint of durability during fuel cell operation.

[Polymer Electrolyte Fuel Cell]

A polymer electrolyte fuel cell according to this embodiment is provided with the above-described membrane electrode assembly (MEA) of this embodiment.

The above-mentioned MEA or an MEA structured by further disposing a pair of gas diffusion electrodes while facing the former MEA may be further combined with a component member(s) (e.g., a bipolar plate(s), packing plate(s)) used for a common polymer electrolyte fuel cell to configure a polymer electrolyte fuel cell.

The bipolar plate means, for instance, a metal-made plate or a composite material that is made of a resin and graphite and has a groove(s) for flowing, for instance, a fuel and/or oxidant gas on the surface. The bipolar plate functions to transfer electrons through an external load circuit as well as serves as a flow path for supplying a fuel and/or an oxidant to the vicinity of the electrode catalyst. A plurality of MEAs of this embodiment may be inserted and stacked between such bipolar plates to manufacture a polymer electrolyte fuel cell according to this embodiment.

EXAMPLES

Hereinbelow, the invention will be specifically described with reference to specific Examples and Comparative Examples. However, this embodiment is not limited to the below-described Examples.

The following shows protocols for measuring various physical properties and procedures for evaluating the properties in Examples and Comparative Examples.

[Protocols for Measuring Physical Properties]

(1) Ion Exchange Capacity

First, 2 to 20 cm$^2$ of each polymer electrolyte membrane, in which a counter ion of an ion-exchange group was protonated, was soaked in 30 mL of saturated NaCl aqueous solution at 25° C., and the material was left while stirring for 30 min.

Next, protons in the saturated NaCl aqueous solution were subjected to neutralization titration with 0.01 N aqueous sodium hydroxide by using phenolphthalein as an indicator.

The post-neutralization polymer electrolyte membrane, in which the counter ion of an ion-exchange group is in a state of sodium ion, was rinsed with pure water and was further vacuum-dried and then weighed.

The substance quantity of sodium hydroxide used for neutralization was represented in M (mmol). The mass of the polymer electrolyte membrane, in which a counter ion of an ion-exchange group was a sodium ion, was represented in W (mg). The equivalent weight EW (g/Eq) was then calculated using the following formula:

$$EW=(W/M)-22.$$

Further, the resulting EW value was inverted and multiplied by 1000. In this way, the ion exchange capacity (meq/g) was calculated.

(2) Membrane Thickness

Each polymer electrolyte membrane was allowed to stand for 1 h or longer in a constant temperature and humidity chamber at 23° C. and 50% RH. Then, a membrane thickness meter (trade name: B-1, manufactured by Toyo Seiki Seisaku-sho, Ltd.) was used to measure the membrane thickness of the polymer electrolyte membrane.

(3) Median Diameter

An autoclave was used to heat and pressurize each polymer electrolyte membrane in a water/ethanol (mass ratio: 2/1) mixed solution as a solvent. In this way, the polymer electrolyte membrane was dissolved and/or suspended to prepare a sample liquid for measurement.

Water was used as a dispersing medium to suitably adjust the sample liquid for measurement. Next, a laser diffraction/scattering particle size distribution analyzer (LA-950, manufactured by HORIBA, Ltd.) was used to measure particles while the refractive index was set to 1.96. The median diameter measured was determined as the median diameter of the (b) scandium compound.

When it was impossible to obtain a sample liquid for measurement as prepared above by dissolving and/or suspending the polymer electrolyte membrane, the median diameter of the (b) scandium compound was measured by the protocol below.

A thin section was prepared from the polymer electrolyte membrane, stained with a dyeing agent such as ruthenium tetroxide in accordance with a routine protocol, and observed under a transmission electron microscope. Then, the median diameter of the stained phase was measured. Here, 20×20-μm random visual fields on the thin section were photographed directly or using a negative film. The photos were input into an image analyzer. Each particle was assumed to be a sphere, and the diameter in terms of the sphere was defined as a median diameter. This median diameter was a value calculated by averaging a volume-based frequency distribution. Note that in the case where the dye border was unclear when a photo of interest was input into the image analyzer, the photo was traced and the traced image was used to input the image into the image analyzer.

[Procedures for Evaluating Properties]

((1) Fenton Test)

Each polymer electrolyte membrane was subjected to pretreatment in an atmosphere under conditions at 200° C. for 2 h.

Next, an aqueous solution containing 2 ppm iron ion and 1% hydrogen peroxide was prepared and heated at 80° C. The pre-treated resulting polymer electrolyte membrane was soaked for 1 h therein for testing.

After that, ion chromatography was used to measure a fluorine ion contained in the post-testing liquid.

The polymer electrolyte membrane was evaluated such that as the amount of fluorine ion (fluorine elution level) decreased, the durability became higher.

((2) Cell Performance Test: IV Measurement Test)

To evaluate performance of each polymer electrolyte membrane or its electrode catalyst layer under high-temperature low-humidity conditions, the following procedures were used to conduct an IV measurement test.

<(2)-1 to Prepare Electrode Catalyst Ink>

First, 20 mass % of perfluorosulfonic acid polymer solution (SS700C/20; manufactured by Asahi Kasei Corporation; equivalent weight (EW): 740) and an electrode catalyst (TEC10E40E; manufactured by TANAKA Kikinzoku Kogyo K. K.; the platinum-supporting amount: 36.7 mass %) were blended at a platinum/perfluorosulfonic acid polymer of 1/1.15 (mass ratio). Next, ethanol was added such that the solid content (sum of the electrode catalyst and the perfluorosulfonic acid polymer) was 11 mass %. Then, the mixture was stirred using a homogenizer (manufactured by AS ONE Corporation) at a rotation speed of 3,000 rpm for 10 min to prepare an electrode catalyst ink.

<(2)-2 to Produce MEA>

An automatic screen printing machine (trade name: LS-150, manufactured by NEWLONG SEIMITSU KOGYO Co., LTD.) was used to apply the electrode catalyst ink on both surfaces of each polymer electrolyte membrane, so that the platinum amount on the anode side was 0.2 mg/cm$^2$ and the platinum amount on the cathode side was 0.3 mg/cm$^2$. The material was dried and solidified under conditions at 140° C. for 5 min to form electrode catalyst layers. In this way, a membrane electrode assembly (MEA) was obtained.

<(2)-3 to Manufacture Fuel Cell Single Cell>

A gas diffusion layer (trade name: GDL35BC, manufactured by MFC Technology, Inc.) was layered onto each electrode of the MEA, followed by layering a gasket, a bipolar plate, and a backing plate. In this way, a fuel cell single cell was obtained.

<(2)-4 IV Performance Measurement Test>

Each fuel cell single cell was set in a tester (a fuel cell evaluation system 890CL, manufactured by TOYO Corporation). The tester was conditioned, if appropriate, and IV performance was measured and tested.

The measurement conditions were conditions in which the cell temperature was at 90° C., the humidification bottle was at 61° C. (at a relative humidity of 30% RH), and hydrogen gas and air gas were supplied at a constant rate of 900 mL/min to the anode side and the cathode side, respectively. In addition, both the anode side and the cathode side were not pressurized (under atmospheric pressure).

Example 1

(Preparation of Polyelectrolyte Solution)

Tetrafluoroethylene and $CF_2=CFO(CF_2)_2—SO_2F$ as precursors of the (a) polyelectrolyte, were used to prepare a perfluorosulfonic acid resin precursor pellet. This pellet was brought into contact with an aqueous solution, in which potassium hydroxide (15 mass %) and methyl alcohol (50 mass %) had been dissolved, at 80° C. for 20 h, and hydrolyzed.

Next, the pellet was immersed in water at 60° C. for 5 h. Then, the pellet was immersed in 2 N aqueous hydrochloric acid solution at 60° C. for 1 h. This treatment was repeated 5 times using a fresh aqueous hydrochloric acid solution every time. After that, the pellet was washed with ion-exchanged water and dried.

This yielded a pellet of the (a) polyelectrolyte with a sulfonic acid group ($SO_3H$) (after the hydrolysis and acid treatment, EW: 740 and the ion exchange capacity: 1.35 meq/g).

The resulting pellet of the (a) polyelectrolyte and an ethanol aqueous solution (water:ethanol=66.7:33.3 (mass ratio)) were together put into a 5-L autoclave and hermetically sealed. While the mixture was stirred with blades, the temperature was raised to 160° C. and then kept for 5 h.

Thereafter, the autoclave was allowed to naturally cool, and 5 mass % homogeneous perfluorosulfonic acid resin solution was then produced.

Next, as the (b) scandium compound, scandium oxide ($Sc_2O_3$, manufactured by Wako Pure Chemical Industries, Ltd.) was soaked in distilled water to extract a polyethylene glycol (PEG)-derived compound. The scandium oxide, which had been subjected to the washing treatment, was then used.

The resulting extract was measured by LC/MS (Liquid Chromatography/Mass Spectrometry). The results revealed peaks assigned to a polyethylene glycol (PEG)-derived compound at a total of 120 ppm.

The post-washing-treatment scandium oxide was placed in an agate mortar, and squeezed and pulverized with an agate pestle. This pulverized scandium oxide was adjusted with ion-exchanged water to give 5 mass % aqueous dispersion. The scandium oxide aggregates were disintegrated by ultrasonic treatment to prepare 5 mass % uniformly dispersed scandium oxide aqueous dispersion. This dispersion was measured using a laser diffraction/scattering particle size distribution analyzer. Here, the median diameter was 6.0 μm.

To 5 mass % homogeneous perfluorosulfonic acid resin solution containing the (a) polyelectrolyte was added the resulting aqueous dispersion containing 5 mass % pulverized and uniformly dispersed scandium oxide from which the polyethylene glycol (PEG)-derived compound had been removed. Then, the (a) polyelectrolyte/the (b) scandium compound was adjusted to 98/2 (mass ratio).

In order to verify the effects of the (b) scandium compound, iron sulfate (II) (manufactured by KANTO CHEMICAL CO., INC.) was blended at 20 ppm based on the perfluorosulfonic acid resin. Finally, a polyelectrolyte solution containing a polyelectrolyte composition was so obtained.

(To Produce Polymer Electrolyte Membrane)

The resulting polyelectrolyte solution was sufficiently stirred with a stirrer and concentrated at 80° C. under reduced pressure to yield a casting solution.

Next, 21 g of the casting solution was poured onto a dish with a diameter of 15.4 cm, and dried on a hot plate at 60° C. for 1 h and at 80° C. for 1 h to remove the solvent.

Then, the dish was put into an oven, and heated at 160° C. for 1 h.

After that, the dish was taken out from the oven, and the resulting membrane was detached from the cooled dish to give a polymer electrolyte membrane with a membrane thickness of 23 μm.

This polymer electrolyte membrane was used to conduct the above Fenton Test. The results obtained were favorable. The results are shown in [Table 1] below.

(To Analyze PEG-Derived Component)

The polymer electrolyte membrane as so obtained was immersed in distilled water to extract a polyethylene glycol (PEG)-derived compound. The resulting extract was measured by LC/MS (Liquid Chromatography/Mass Spectrometry). The results revealed peaks assigned to the PEG-derived component at a total of 0.01 ppm.

(To Prepare Electrode Catalyst Ink)

The resulting perfluorosulfonic acid resin solution, a polyelectrolyte solution, was blended with an electrode catalyst (TEC10E40E; manufactured by TANAKA Kikinzoku Kogyo K. K.; the platinum-supporting amount: 36.7 mass %) at a platinum/perfluorosulfonic acid polymer of 1/1.15 (mass ratio).

Ethanol was then added such that the solid content (sum of the electrode catalyst, the perfluorosulfonic acid polymer, and polyphosphoric acid) was 11 mass %. Finally, the mixture was stirred using a homogenizer (manufactured by AS ONE Corporation) at a rotation speed of 3,000 rpm for 10 min to prepare an electrode catalyst ink.

(To Produce Membrane Electrode Assembly)

An automatic screen printing machine (trade name: LS-150, manufactured by NEWLONG SEIMITSU KOGYO Co., LTD.) was used to apply the resulting electrode catalyst ink on both surfaces of the scandium oxide-containing polymer electrolyte membrane as obtained in the section (To Produce Polymer electrolyte membrane), so that the platinum amount on the anode side was 0.2 mg/cm$^2$ and the platinum amount on the cathode side was 0.3 mg/cm$^2$. The resulting material was dried and solidified under conditions at 140° C. for 5 min to produce a membrane electrode assembly (MEA).

(To Manufacture Fuel Cell Single Cell)

A gas diffusion layer (trade name: GDL35BC, manufactured by MFC Technology, Inc.) was layered onto each electrode of the membrane electrode assembly (MEA) as so obtained, followed by layering a gasket, a bipolar plate, and a backing plate. In this way, a fuel cell single cell was obtained.

The resulting fuel cell single cell was used to conduct the above (2) IV Performance Measurement Test. The results obtained were favorable. The results are shown in [Table 1] below.

Example 2

The (b) scandium compound used was scandium oxide provided such that scandium oxide (Sc$_2$O$_3$, manufactured by Wako Pure Chemical Industries, Ltd.) was immersed in 2 N nitric acid aqueous solution at room temperature for 3 h, washed with ion-exchanged water, and then dried (i.e., subjected to washing treatment).

Substantially the same procedure as in [Example 1] was repeated to analyze a PEG-derived component in pre-washing-treatment scandium oxide. Before the washing treatment, peaks assigned to the PEG-derived component at a total of 120 ppm appeared. By contrast, after the washing treatment, peaks assigned to the PEG-derived component at a total of 0.6 ppm were observed.

The post-washing-treatment scandium oxide was used and uniformly dispersed by squeezing, pulverizing, and dispersing it by substantially the same procedure as in [Example 1]. Then, 5 mass % scandium oxide aqueous dispersion was obtained. This dispersion was measured using a laser diffraction/scattering particle size distribution analyzer. Here, the median diameter was 4.0 μm. Thereafter, substantially the same technique as in [Example 1] was used to produce a polymer electrolyte membrane with a membrane thickness of 23 μm.

Subsequently, this polymer electrolyte membrane was used to conduct Fenton test by substantially the same procedure as in [Example 1]. The results obtained were favorable. The results are shown in [Table 1] below.

In addition, substantially the same procedure as in [Example 1] was repeated to analyze a polyethylene glycol (PEG)-derived compound in the polymer electrolyte membrane. The results revealed peaks assigned to the PEG-derived component at a total of 0.01 ppm.

Further, substantially the same procedure as in [Example 1] was repeated to produce a membrane electrode assembly (MEA). A fuel cell single cell was then obtained. Substantially the same procedure as in [Example 1] was used to conduct an IV performance measurement test. The results obtained were favorable. The results are shown in [Table 1] below.

Example 3

The (b) scandium compound used was scandium oxide (Sc$_2$O$_3$, manufactured by Wako Pure Chemical Industries, Ltd.) that had not been subjected to the washing treatment and contained a PEG-derived component at a total of 120 ppm.

The non-washing-treatment scandium oxide was used and uniformly dispersed by squeezing, pulverizing, and dispersing it by substantially the same procedure as in [Example 1]. Then, 5 mass % scandium oxide aqueous dispersion was obtained. This dispersion was measured using a laser diffraction/scattering particle size distribution analyzer. Here, the median diameter was 7.0 μm. Thereafter, substantially the same technique as in [Example 1] was used to produce a polymer electrolyte membrane with a membrane thickness of 23 μm.

This polymer electrolyte membrane was immersed in 2 N nitric acid aqueous solution at 60° C. for 3 h, washed with ion-exchanged water, and then dried (i.e., subjected to washing treatment).

Subsequently, this polymer electrolyte membrane was used to conduct Fenton test by substantially the same procedure as in [Example 1]. The results obtained were favorable. The results are shown in [Table 1] below.

In addition, substantially the same procedure as in [Example 1] was repeated to analyze a polyethylene glycol (PEG)-derived compound in the polymer electrolyte membrane. The results revealed peaks assigned to the PEG-derived component at a total of 0.09 ppm.

Further, substantially the same procedure as in [Example 1] was repeated to produce a membrane electrode assembly (MEA). A fuel cell single cell was then obtained. Substantially the same procedure as in [Example 1] was used to conduct an IV performance measurement test. The results obtained were favorable. The results are shown in [Table 1] below.

Example 4

The (b) scandium compound used was scandium oxide provided such that scandium oxide ($Sc_2O_3$, manufactured by Wako Pure Chemical Industries, Ltd.) was immersed in 30% hydrogen peroxide at room temperature for 3 h, washed with ion-exchanged water, immersed in 2 N nitric acid aqueous solution at room temperature for 3 h, washed with ion-exchanged water, and then dried (i.e., subjected to washing treatment).

Substantially the same procedure as in [Example 1] was repeated to analyze a PEG-derived component in pre-washing-treatment scandium oxide. Before the washing treatment, peaks assigned to the PEG-derived component at a total of 120 ppm appeared. By contrast, after the washing treatment, peaks assigned to the PEG-derived component at a total of 0.6 ppm were observed.

A planetary ball mill (PULVERISETTE6, manufactured by FRITSCH, Inc.) was used to pulverize the post-washing-treatment scandium oxide. This material was measured with a laser diffraction/scattering particle size distribution analyzer. Here, the median diameter was 0.1 μm.

Except that the above washed and pulverized scandium oxide was used to adjust the (a) polyelectrolyte/the (b) scandium compound to 99/1 (mass ratio), substantially the same procedure as in [Example 1] was repeated to produce a polymer electrolyte membrane with a membrane thickness of 23 μm.

Subsequently, this polymer electrolyte membrane was used to conduct Fenton test by substantially the same procedure as in [Example 1]. The results obtained were favorable. The results are shown in [Table 1] below.

In addition, substantially the same procedure as in [Example 1] was repeated to analyze a polyethylene glycol (PEG)-derived compound in the polymer electrolyte membrane. The results revealed peaks assigned to the PEG-derived component at a total of 0.01 ppm.

Further, substantially the same procedure as in [Example 1] was repeated to produce a membrane electrode assembly (MEA). A fuel cell single cell was then obtained. Substantially the same procedure as in [Example 1] was used to conduct an IV performance measurement test. The results obtained were favorable.

The results are shown in [Table 1] below.

Example 5

Except that the (a) polyelectrolyte/the (b) scandium compound was adjusted to 95/5 (mass ratio), substantially the same procedure as in [Example 1] was repeated to produce a polymer electrolyte membrane with a membrane thickness of 23 μm.

Subsequently, this polymer electrolyte membrane was used to conduct Fenton test by substantially the same procedure as in [Example 1]. The results obtained were favorable. The results are shown in [Table 1] below.

In addition, substantially the same procedure as in [Example 1] was repeated to analyze a polyethylene glycol (PEG)-derived compound in the polymer electrolyte membrane. The results revealed peaks assigned to the PEG-derived component at a total of 0.03 ppm.

Further, substantially the same procedure as in [Example 1] was repeated to produce a membrane electrode assembly (MEA). A fuel cell single cell was then obtained. Substantially the same procedure as in [Example 1] was used to conduct an IV performance measurement test. The results obtained were favorable.

The results are shown in [Table 1] below.

Example 6

Except that the (b) scandium compound used was scandium oxide ($Sc_2O_3$, manufactured by Wako Pure Chemical Industries, Ltd.) with an average particle size of 13.0 μm and the (a) polyelectrolyte/the (b) scandium compound was adjusted to 99/1 (mass ratio), substantially the same procedure as in [Example 1] was repeated to produce a polymer electrolyte membrane with a membrane thickness of 23 μm.

Subsequently, this polymer electrolyte membrane was used to conduct Fenton test by substantially the same procedure as in [Example 1]. The results obtained were favorable. The results are shown in [Table 1] below.

Comparative Example 1

Except that no (b) scandium compound is blended, substantially the same procedure as in [Example 1] was repeated to produce a polymer electrolyte membrane with a membrane thickness of 23 μm.

Subsequently, substantially the same procedure as in [Example 1] was used to conduct Fenton test. The results were demonstrated to be poor.

Comparative Example 2

Substantially the same procedure as in [Example 3] was used to produce a polymer electrolyte membrane with a membrane thickness of 23 μm.

Subsequently, this polymer electrolyte membrane was used to conduct Fenton test by substantially the same procedure as in [Example 1]. The results obtained were favorable. The results are shown in [Table 1] below.

In addition, substantially the same procedure as in [Example 1] was repeated to analyze a PEG-derived component in the electrolyte membrane. The results revealed peaks assigned to the PEG-derived component at a total of 15 ppm.

Further, substantially the same procedure as in [Example 1] was repeated to produce a membrane electrode assembly (MEA). A fuel cell single cell was then obtained. Substantially the same procedure as in [Example 1] was used to conduct an IV performance measurement test. The results obtained were poor. The results are shown in [Table 1] below.

TABLE 1

|  | Content (mass %) of (b) scandium compound in a polymer electrolyte membrane | Median diameter (μm) of (b) scandium compound | Total content (ppm) of PEG-derived component in a polymer electrolyte membrane | Fenton test (F elution level/ ppm) | IV performance (V @ 0.2 mA/cm²) |
|---|---|---|---|---|---|
| Example 1 | 2 | 6.0 | 0.01 | 1.2 | 0.69 |
| Example 2 | 2 | 4.0 | 0.01 | 1.1 | 0.69 |
| Example 3 | 2 | 7.0 | 0.09 | 1.2 | 0.69 |
| Example 4 | 1 | 0.1 | 0.01 | 0.8 | 0.73 |
| Example 5 | 5 | 4.0 | 0.03 | 0.7 | 0.55 |
| Example 6 | 1 | 13.0 | 0.01 | 4.0 | 0.71 |
| Comparative Example 1 | 0 | — | — | 6.5 | — |
| Comparative Example 2 | 2 | 10.0 | 15 | 1.2 | 0.48 |

The present application was based on Japanese Patent Application (JP 2019-102607) filed with JPO on May 31, 2019, the content of which is herein incorporated by reference.

INDUSTRIAL APPLICABILITY

The polymer electrolyte membrane or the membrane electrode assembly of this embodiment is industrially applicable to the field of polymer electrolyte fuel cells.

The invention claimed is:

1. A polymer electrolyte membrane comprising:
   (a) a polyelectrolyte having an ion exchange capacity of from 0.5 to 3.0 meq/g; and
   (b) at least one scandium compound selected from the group consisting of scandium oxide, scandium acetate, scandium sulfate, scandium nitrate, and scandium carbonate, wherein
   a polyethylene glycol (PEG)-derived compound in the polymer electrolyte membrane has a total content of greater than 0 and 10 ppm or less.

2. The polymer electrolyte membrane according to claim 1, wherein the (b) scandium compound in the polymer electrolyte membrane has a content of 0.0001 mass % or more and 3 mass % or less.

3. The polymer electrolyte membrane according to claim 1, wherein the (b) scandium compound is dispersed in the (a) polyelectrolyte.

4. The polymer electrolyte membrane according to claim 1, wherein the (b) scandium compound has a median diameter of 0.0001 μm or more and 12.0 μm or less.

5. The polymer electrolyte membrane according to claim 1, wherein a polyethylene glycol (PEG)-derived compound in the (b) scandium compound has a total content of 100 ppm or less.

6. The polymer electrolyte membrane according to claim 1, wherein the (a) polyelectrolyte is a fluorinated polymer electrolyte.

7. The polymer electrolyte membrane according to claim 1, wherein the (a) polyelectrolyte is a fluorinated polymer electrolyte represented by the following general formula (1):

$$-[CF_2CX^1X^2]_a-[CF_2-CF(-O-(CF_2-CF(CF_2X^3))_b-O_c-(CFR^1)_d-(CFR^2)_e-(CF_2)_f-X^4)]_g- \quad (1)$$

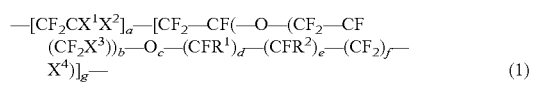

wherein $X^1$, $X^2$, and $X^3$ are, each independently, a halogen element or a perfluoroalkyl group having 1 to 3 carbon atoms; a and g satisfy $0 \leq a < 1$, $0 < g \leq 1$, and $a+g=1$, b is an integer of 0 to 8, c is 0 or 1, d and e are, each independently, an integer of 0 to 6, f is an integer of 0 to 10, provided that $d+e+f$ is not equal to 0; $R^1$ and $R^2$ are, each independently, a halogen element or a perfluoroalkyl group or fluorochloroalkyl group having 1 to 10 carbon atoms; and $X^4$ is COOZ, $SO_3Z$, $PO_3Z_2$, or $PO_3HZ$, wherein Z is a hydrogen atom, an alkali metal atom, an alkali earth metal atom, or an amine such as $NH_4$, $NH_3R^3$, $NH_2R^3R^4$, $NHR^3R^4R^5$, or $NR^3R^4R^5R^6$ where $R^3$, $R^4$, $R^5$ and $R^6$ are each an alkyl group or an arene group.

8. The polymer electrolyte membrane according to claim 1, further comprising (c) a radical scavenger.

9. A membrane electrode assembly comprising:
   the polymer electrolyte membrane according to claim 1; and
   an electrode catalyst layer placed on the polymer electrolyte membrane.

10. The membrane electrode assembly according to claim 9, wherein the electrode catalyst layer comprises:
    (a) a polyelectrolyte having an ion exchange capacity of from 0.5 to 3.0 meq/g; and
    (b) at least one scandium compound selected from the group consisting of scandium oxide, scandium acetate, scandium sulfate, scandium nitrate, and scandium carbonate.

11. A polymer electrolyte fuel cell comprising the membrane electrode assembly according to claim 9.

12. A process for producing a polymer electrolyte membrane, comprising:
    adjusting, to 100 ppm or less, a total content of a polyethylene glycol (PEG)-derived compound in (b) at least one scandium compound selected from the group consisting of scandium oxide, scandium acetate, scandium sulfate, scandium nitrate, and scandium carbonate;
    dispersing, in a polyelectrolyte solution, the resulting (b) scandium compound, in which the total content of the polyethylene glycol (PEG)-derived compound has been adjusted to 100 ppm or less, to prepare a mixed liquid; and
    using the mixed liquid to produce a membrane.

* * * * *